United States Patent
Wang et al.

(10) Patent No.: US 11,314,812 B2
(45) Date of Patent: Apr. 26, 2022

(54) DYNAMIC WORKFLOW WITH KNOWLEDGE GRAPHS

(71) Applicant: International Business Machines Corporation, Armonk, NY (US)

(72) Inventors: Wen Wang, Beijing (CN); Guang Qing Zhong, Beijing (CN); Yi Ming Wang, Xi'an (CN); Jian Dong Yin, Beijing (CN); Zhuo Cai, Beijing (CN); Rong Fu, Ningbo (CN); Kang Zhang, Shanghai (CN); Hao Sheng, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 16/702,684

(22) Filed: Dec. 4, 2019

(65) Prior Publication Data
US 2021/0173873 A1    Jun. 10, 2021

(51) Int. Cl.
*G06F 16/903* (2019.01)
*G06F 16/901* (2019.01)
(Continued)

(52) U.S. Cl.
CPC .... *G06F 16/90335* (2019.01); *G06F 16/9024* (2019.01); *G06F 40/58* (2020.01); *G06N 5/02* (2013.01)

(58) Field of Classification Search
CPC .......... G06F 16/90335; G06F 16/9024; G06F 40/58; G06F 16/90332; G06F 40/30;
(Continued)

(56) References Cited

U.S. PATENT DOCUMENTS

2016/0373456 A1* 12/2016 Vermeulen ............ G06F 16/245
2018/0144053 A1   5/2018 Ankisettipalli et al.
(Continued)

OTHER PUBLICATIONS

Ramesh K., Ravishankaran S., Joshi A., Chandrasekaran K. (2017), title: "A Survey of Design Techniques for Conversational Agents". In: Kaushik S., Gupta D., Kharb L., Chahal D. (eds) Information, Communication and Computing Technology. ICICCT 2017. vol 750. Springer, Singapore (Year: 2017).*

(Continued)

*Primary Examiner* — Evan Aspinwall
(74) *Attorney, Agent, or Firm* — Scott S. Dobson; Hunter E. Webb; Keohane & D'Alessandro, PLLC

(57) ABSTRACT

Disclosed embodiments provide techniques for computerized technical support. A knowledge graph for a computer application is established. An input query from a user is processed to extract entities used as action identifiers. One or more nodes within the knowledge graph are identified, along with corresponding relationship edges leading to the nodes. When multiple candidate nodes are found that contain information relevant to the input query, a custom clarification statement is created based on the one or more identified relationship edges. The user provides answers to the clarification statement to narrow down which nodes contain the most relevant information. This process may continue, eliminating nodes based on user responses, until a single node remains, corresponding to an action identifier. The action identifier includes action description information that provides technical assistance to a user.

20 Claims, 16 Drawing Sheets

(51) Int. Cl.
*G06F 40/58* (2020.01)
*G06N 5/02* (2006.01)

(58) Field of Classification Search
CPC ............... G06F 16/243; G06F 16/3322; G06F 16/3329; G06F 16/3344; G06F 9/453; G06N 5/02; G06N 20/00; G06N 3/006; G06N 3/08
USPC ......................................................... 707/769
See application file for complete search history.

(56) References Cited

U.S. PATENT DOCUMENTS

| | | | |
|---|---|---|---|
| 2018/0196796 A1 | 7/2018 | Wu | |
| 2019/0042988 A1* | 2/2019 | Brown | G06F 16/9535 |
| 2019/0251169 A1* | 8/2019 | Loghmani | G06F 40/30 |
| 2020/0410012 A1* | 12/2020 | Moon | G06N 3/049 |

OTHER PUBLICATIONS

Ramesh, Kiran et al., "A Survey of Design Techniques for Conversational Agents", ICICCT 2017, CCIS 750, pp. 336-350, 2017.

\* cited by examiner

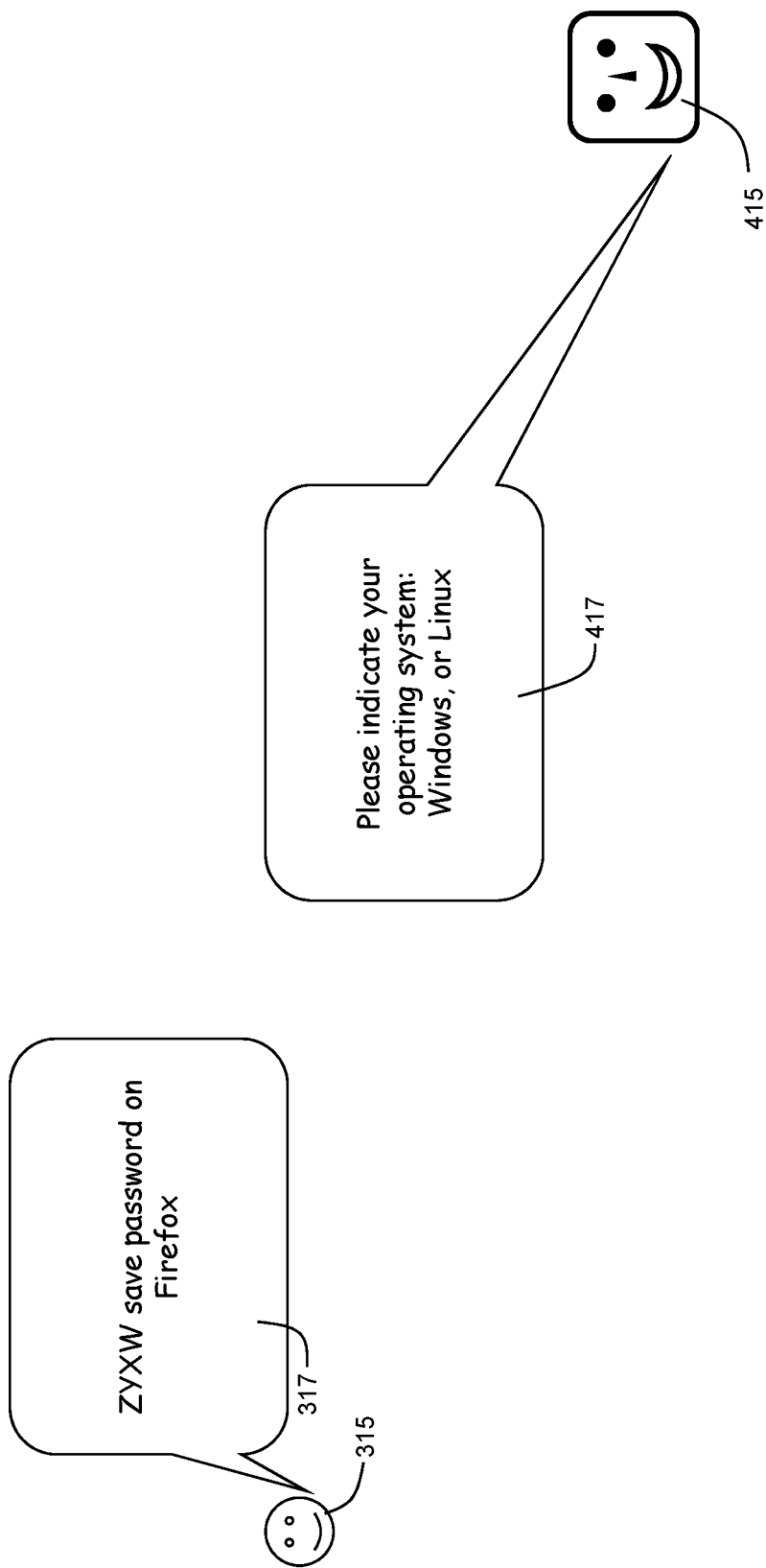

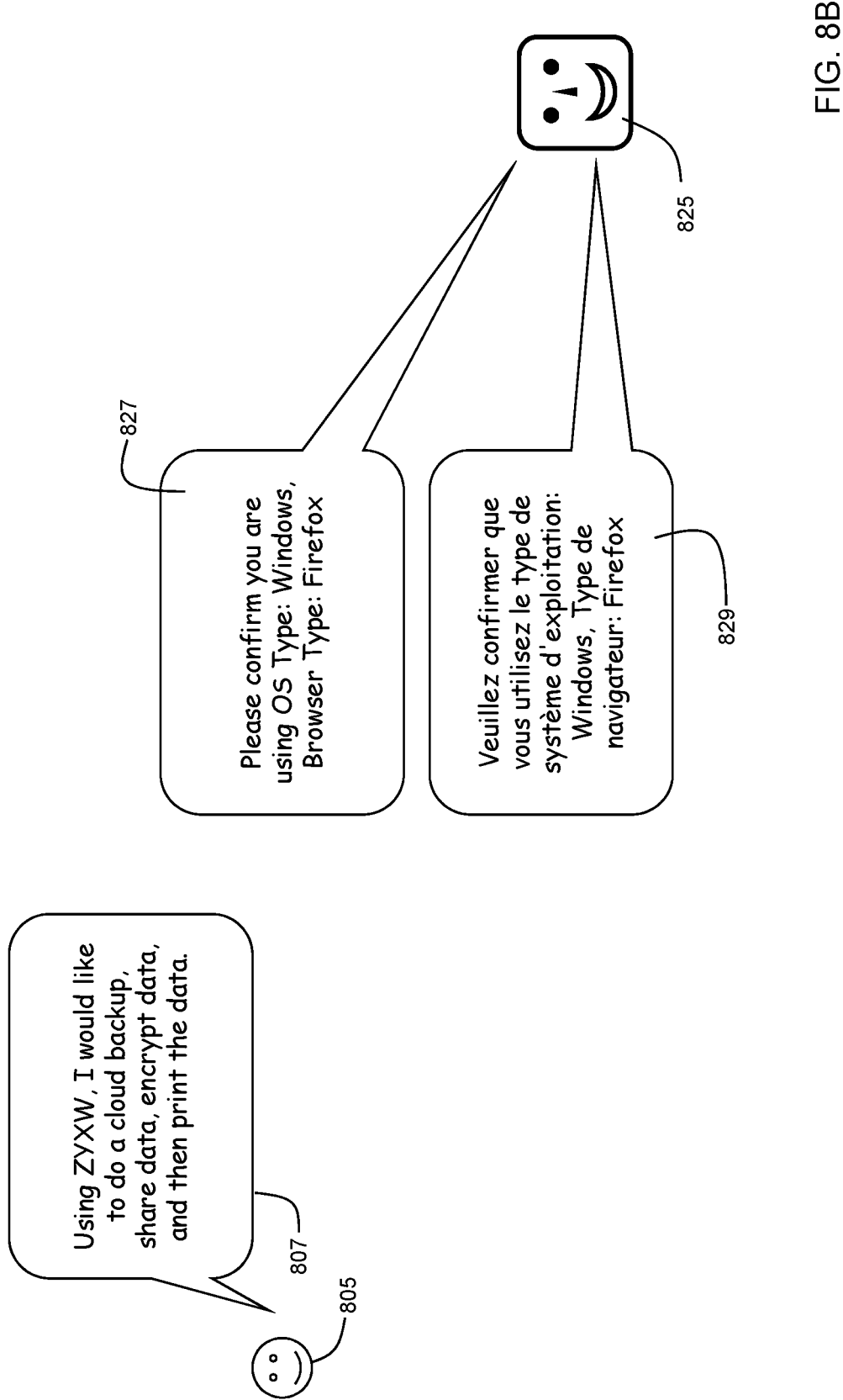

DYNAMIC WORKFLOW WITH KNOWLEDGE GRAPHS

FIELD

The present invention relates generally to computerized technical support, and more particularly, to dynamic workflow with knowledge graphs.

BACKGROUND

Computerized technical support provides virtual assistants (VAs, or chatbots) simulating humans at the other end of a conversation. Chatbots are deployed in the field for assisting end users by providing information or helping with tasks such as installation or troubleshooting. Users can interact with chatbots via voice questions/commands and responses, and/or text-based questions/commands and responses. Chatbots enable scalability as they can provide initial support to a large number of users without the need for human intervention. Thus, computerized technical support is an important component of many enterprises. It is therefore desirable to have improvements in computerized technical support.

SUMMARY

In one embodiment, there is provided a computer-implemented method for generating an automated technical support workflow, comprising: receiving an input query; processing the input query to extract an action identifier; identifying one or more nodes within a knowledge graph that include the action identifier; identifying one or more relationship edges for the one or more identified nodes; and in response to more than one identified node being found, creating a custom clarification statement based on the one or more identified relationship edges and the one or more identified nodes.

In another embodiment, there is provided an electronic computation device comprising: a processor; a memory coupled to the processor, the memory containing instructions, that when executed by the processor, cause the electronic computation device to: receive an input query; process the input query to extract an action identifier; identify one or more nodes within a knowledge graph that include the action identifier; identify one or more relationship edges for the one or more identified nodes; and in response to more than one identified node being found, create a custom clarification statement based on the one or more identified relationship edges and the one or more identified nodes.

In yet another embodiment, there is provided a computer program product for an electronic computation device comprising a computer readable storage medium having program instructions embodied therewith, the program instructions executable by a processor to cause the electronic computation device to: receive an input query; process the input query to extract an action identifier; identify one or more nodes within a knowledge graph that include the action identifier; identify one or more relationship edges for the one or more identified nodes; and in response to more than one identified node being found, create a custom clarification statement based on the one or more identified relationship edges and the one or more identified nodes.

BRIEF DESCRIPTION OF THE DRAWINGS

Features of the disclosed embodiments will be more readily understood from the following detailed description of the various aspects of the invention taken in conjunction with the accompanying drawings.

FIG. 5B indicates an exemplary custom clarification statement in accordance with embodiments of the present invention.

FIG. 8B indicates an exemplary conditioning of the action description information.

Figure 1:
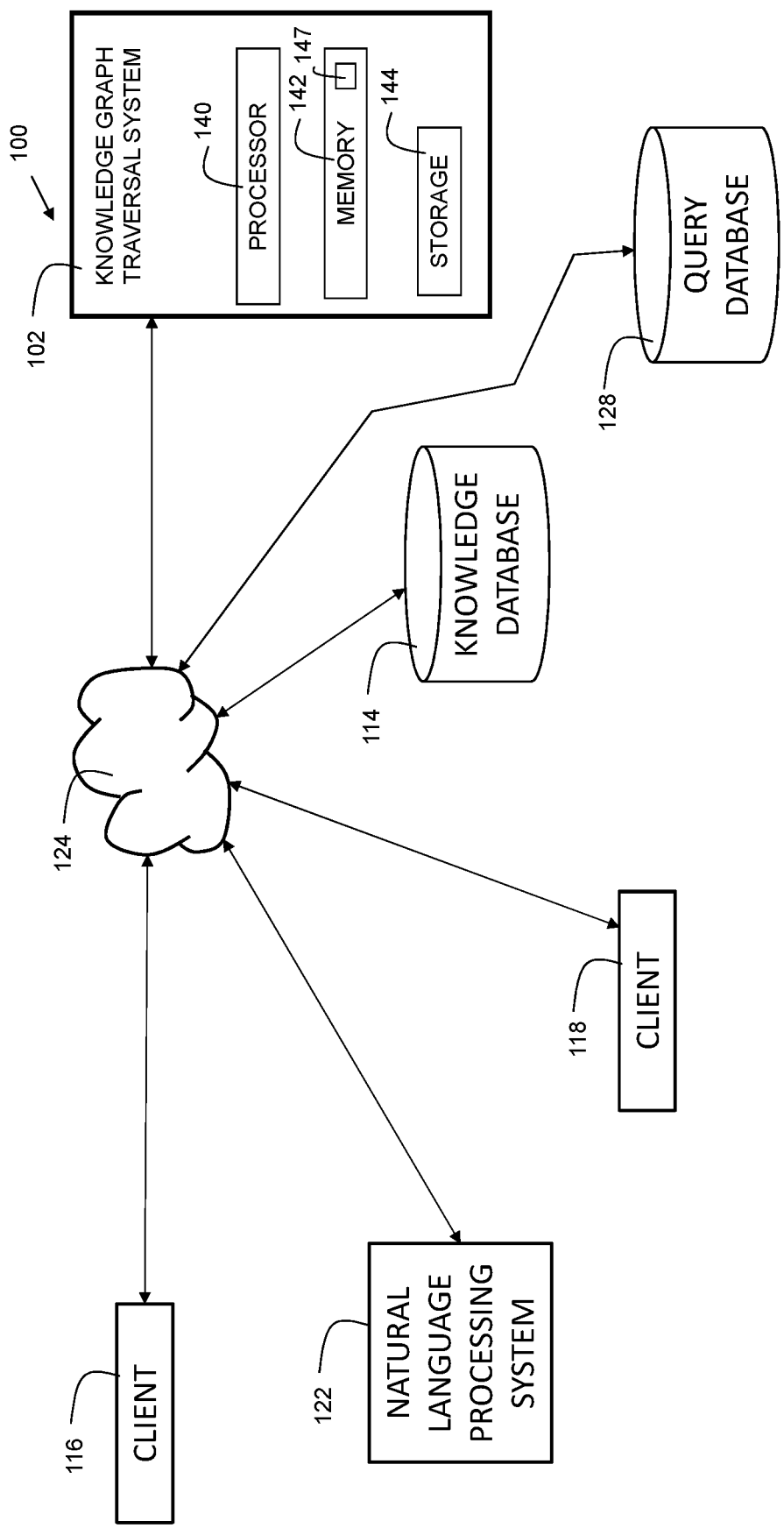
FIG. 1 is an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for computerized technical support. A knowledge graph for a computer application is established. An input query from a user is processed to extract entities used as action identifiers. One or more nodes within the knowledge graph are identified, along with corresponding relationship edges leading to the nodes. When multiple candidate nodes are found that contain information relevant to the input query, a custom clarification statement is created based on the one or more identified relationship edges. The user provides answers to the clarification statement to narrow down which nodes contain the most relevant information. This process may continue, eliminating nodes based on user responses, until a single node remains, corresponding to an action identifier. The action identifier includes action description information that provides technical assistance to a user.

A workflow, for the purposes of this disclose, refers to the flow of communication between a human user and a computerized system. The workflow can include a question from a human user. The computerized system may respond with an answer, or with another question. The workflow refers to the back-and-forth dialog/communication/interaction that takes place between a human user and a computerized system during the process of obtaining technical support and/or obtaining information.

Prior art computerized technical support systems rely on predefined workflows for a given application. This has multiple disadvantages. One disadvantage is that when the workflow changes (e.g., to a revised application), the workflow may need to be revised. Another disadvantage is that data may be duplicated, in that each workflow that needs to handle a particular function may require its own copy of the data. This increases storage requirements and also creates maintenance challenges as multiple copies of data may need to be updated as an application changes.

Disclosed embodiments overcome the aforementioned shortcomings by storing the application information in a knowledge graph. The knowledge graph contains multiple nodes, connected by edges. Each node represents an entity. Each edge represents a relationship between entities. Workflow (troubleshooting sequence) information is not stored in the knowledge graph. Hence, the knowledge graph contains information about the application, but is decoupled from the technical support workflow. With embodiments of the present invention, the arduous task of computerized technical support is greatly simplified.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 is an environment 100 for embodiments of the present invention. Knowledge graph traversal system 102 comprises a processor 140, a memory 142 coupled to the processor 140, and storage 144. Knowledge graph traversal system 102 is an electronic computation device. The memory 142, contains instructions 147, that when executed by the processor 140, perform embodiments of the present invention. Memory 142 may include dynamic random-access memory (DRAM), static random-access memory (SRAM), magnetic storage, and/or a read only memory such as flash, EEPROM, optical storage, or other suitable memory. In some embodiments, the memory 142 may not be a transitory signal per se. In some embodiments, storage 144 may include one or more magnetic storage devices such as hard disk drives (HDDs). Storage 144 may additionally include one or more solid state drives (SSDs). Knowledge graph traversal system 102 is connected to network 124, which can include the Internet, a wide area network, a local area network, or other suitable network.

Knowledge database 114 contains multiple knowledge graphs. The knowledge graphs are logically represented as nodes connected by edges. Nodes comprise information about a particular aspect of an application or other entity for which knowledge of that entity is maintained. The edges interconnect two nodes and represent a relationship between the two nodes that are connected by the edge. The knowledge graph may be stored in a variety of different formats, including, but not limited to, JSON (JavaScript Object Notation) files, JSON-LD (JSON Linking Data) files, XML files, YAML files, and/or other suitable storage formats. The knowledge graph traversal system 102 accesses the knowledge database 114 via network 124 in order to retrieve information stored within nodes of knowledge graphs stored within the knowledge database 114.

Client device 116 and client device 118 are end-user devices used to interact with the knowledge graph traversal system 102. The client devices can include desktop computers, laptop computers, tablet computers, smartphones, wearable computing devices, and/or other suitable computing devices. In embodiments, the client devices utilize an application (app), which may include a browser, such as an HTML browser, to provide a user interface for submitting queries and receiving knowledge information. While two client devices 116 and 118 are depicted in FIG. 1, in practice, there can be many more clients connected to, and interacting with, knowledge graph traversal system 102.

Natural language processing system 122 is included in environment 100. Natural language processing system 122 may include one or more computing devices configured to perform computerized natural language processing tasks and functions. These tasks can include entity detection, disambiguation, context extraction, phoneme analysis, text-to-speech processing, speech-to-text processing, and/or foreign language translation.

In embodiments, clients such as client device 116 or 118 provide input queries via written and/or spoken input. The input query can include verbally uttering questions and/or statements into a microphone on the client device. The input query can include typing questions and/or statements on a keyboard/user interface of the client device. The input query from the client device may then be sent to the natural language processing system 122 to extract entities, keywords, and/or context from the input query. As an example, if a user types into the client device "how do I change fonts in the ZYXW application?" then the input query of "how do I change fonts in the ZYXW application?" is provided to the natural language processing system 122 to extract context, entities, and or generate keywords. In this example, keywords may include "fonts" and "ZYXW application." The first clause of the input query "how do I" may be identified as an information request. The keywords of "fonts" and "ZYXW application" may be used as criteria by the knowledge graph traversal system 102 to identify and traverse the appropriate knowledge graph stored in knowledge database 114.

Often, the input query does not contain all the needed information to provide a relevant answer to the user. As an example, with application support, there can be various versions of an application, and/or various platforms (e.g., Windows, Mac, Linux, etc.) or environments in which an application can execute. Thus, additional questions may be fed back to the user to further narrow the list of relevant knowledge graph nodes that contain relevant information. In this way, meaningful and relevant information can be provided to the user to resolve technical problems and resolve end-user issues.

In embodiments, a query database 128 may be used to store previous input queries and associated knowledge graph nodes that contain relevant information for a given input query. As an example, when the user of client device 116 provides an input query of "how do I change fonts in the ZYXW application?" then, the knowledge graph may perform an iterative process to identify relevant knowledge graph nodes. Once the relevant knowledge graph nodes for the input query are identified, the input query, along with the corresponding relevant knowledge graph node information is stored in the query database 128. If at a later time, the user of client device 118 provides a similar input query, the corresponding knowledge graph node information can be retrieved from query database 128, without the need for performing a full knowledge graph traversal. In this way, the processing time, and thus, the time required to provide a response to the user, can be reduced. Thus, if the user of client device 118 also provides an input query of "how do I change fonts in the ZYXW application?" then the initial starting point for knowledge graph traversal can be retrieved from the query database 128 instead of starting from the beginning each time. Over time, as more input queries are stored in query database 128, the likelihood increases that a newly submitted input query is similar to a previously submitted input query stored in the query database 128. Thus, over time, disclosed embodiments can provide improved performance based on user's input queries.

Figure 2:
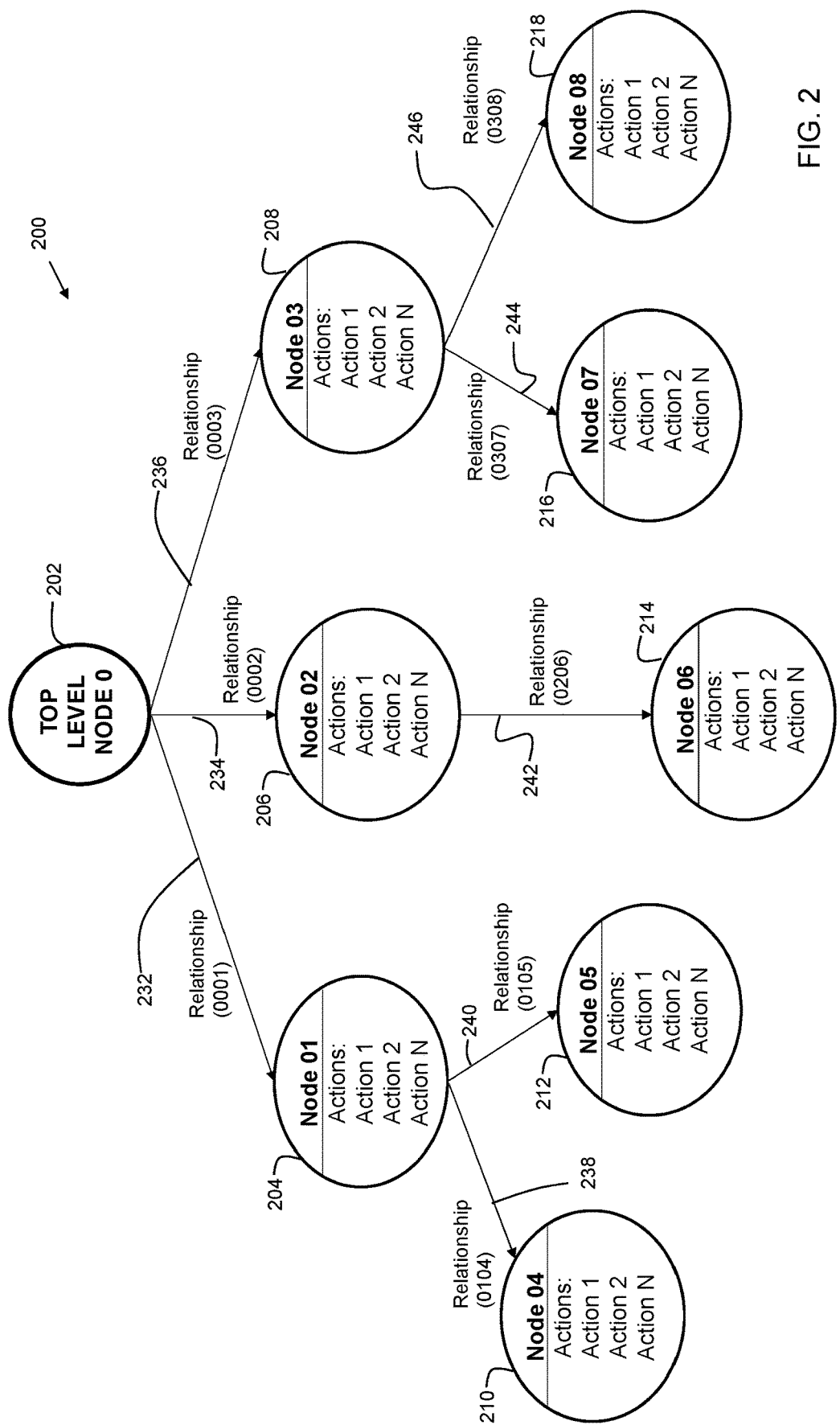
FIG. 2 is a knowledge graph in accordance with embodiments of the present invention.

FIG. 2 is a knowledge graph 200 in accordance with embodiments of the present invention. The knowledge graph 200 includes a top-level node 202, also referred to as node 0. Below node 202 are three second-level nodes, indicated as 204 (Node 01), 206 (Node 02), and 208 (Node 3). Between each node is an edge, which signifies a relationship between the nodes. Between node 202 and node 204 is edge 232, which represents relationship 0001. The tuple of data including two nodes and their connected edge is referred to as a "triple" in the form entity-relation-entity. For example, between node 202 and node 206 is edge 234, which represents relationship 0002. Thus, in this case, the tuple of elements 202, 234, and 206 represent two entities and their relationship. Between node 202 and node 208 is edge 236, which represents relationship 0003. Similarly, between node 204 and node 210 (Node 4) is edge 238, which represents relationship 0104. Between node 204 and node 212 (Node 5) is edge 240, which represents relationship 0105. Between node 206 and node 214 (Node 6) is edge 242, which represents relationship 0206. Between node 208 and node 216 (Node 7) is edge 244, which represents relationship 0307. Between node 208 and node 218 (Node 8) is edge 246, which represents relationship 0308. In practice, there can be more or fewer nodes in a knowledge graph than what is depicted in FIG. 2. Within each node, one or more action identifiers are stored. The action identifiers include information to provide, and/or actions to take, in order to perform a task and/or resolve an issue stated in an input query. In embodiments, each edge is coded with a numerical value based on its corresponding nodes. As an example, edge 242 is coded as relationship 0206, since it defines a relationship between node 2 (206) and node 6 (214). In this way, as new nodes are added, and new edges are defined, each edge has a unique numerical identifier which can be used by the knowledge graph traversal system 102 in the parsing, traversing, and/or analysis of knowledge graphs stored in knowledge database 114. The knowledge graph 200 is small, and used for illustrating embodiments of the present invention. In practice, the knowledge graph can be large, with hundreds, or even thousands of nodes, and edges, thus containing many possible entity-relationship-entity tuples.

Figure 3:
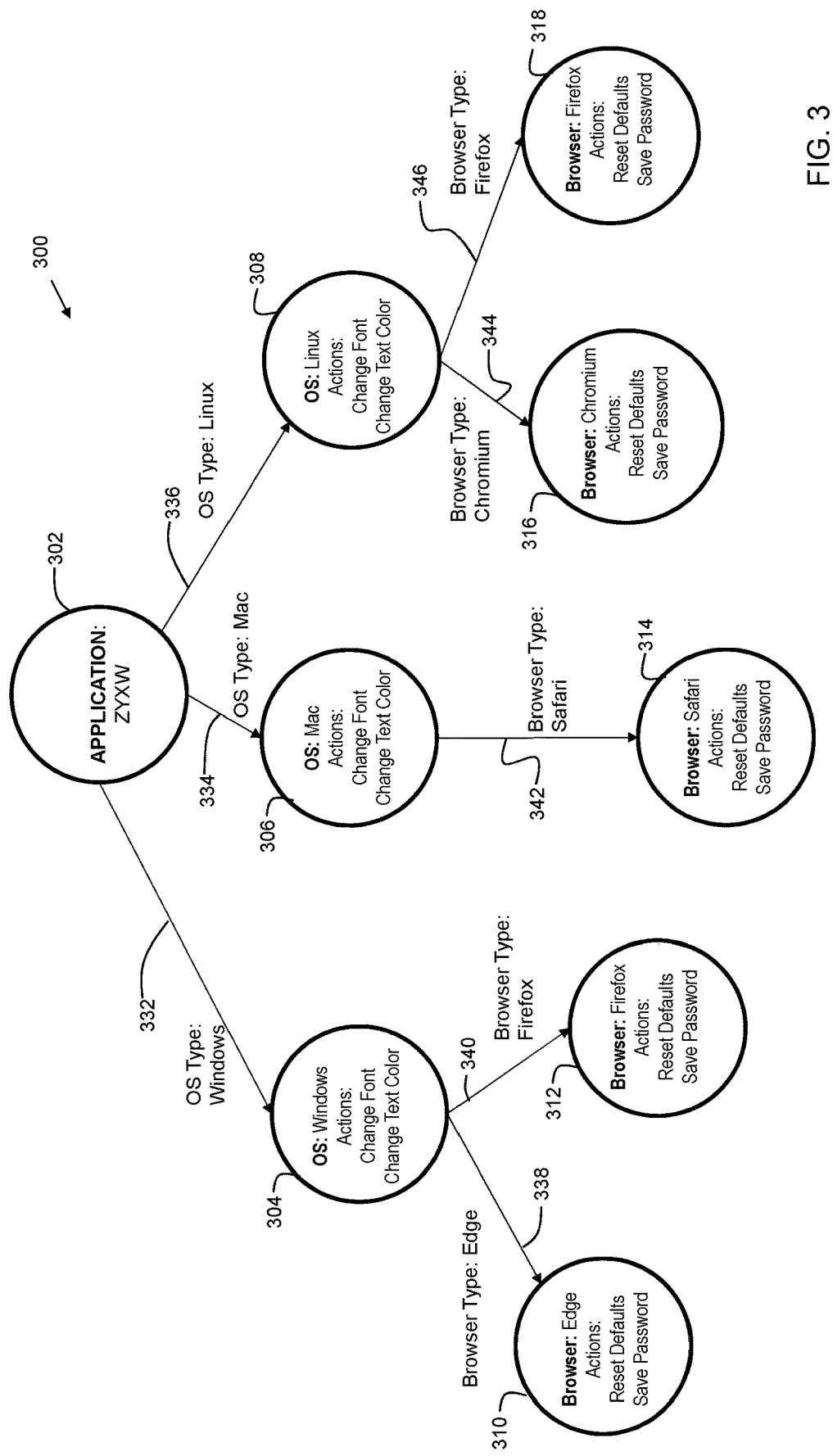
FIG. 3 is an exemplary knowledge graph for application support in accordance with embodiments of the present invention.

FIG. 3 is an exemplary knowledge graph 300 for application support in accordance with embodiments of the present invention. Knowledge graph 300 is similar in structure to knowledge graph 200 depicted in FIG. 2, but showing a specific example, rather than the general structure. The example of FIG. 3 shows a knowledge graph for a computer application "ZYWX." When a user has a question regarding use of application ZYWX, the user submits an input query through his/her client device. The knowledge graph traversal system 102 processes the input query by searching through nodes within knowledge graph 300 to identifier nodes that contain appropriate action identifiers to respond to the input query. In embodiments, the top-level node 302 is used to identify an appropriate knowledge graph. Thus, if a user requests information about ZYWX application, knowledge graph 300 is identified as a relevant knowledge graph based on the top-level node information.

The next level of nodes (304, 306, and 308) contain information specific to different operating systems. The corresponding edges define the relationship between the top-level node 302, and the next level of nodes (304, 306, and 308). Edge 332 represents a relationship of OS (operating system) type of Windows®. Edge 334 represents a relationship of OS type of Mac®. Edge 336 represents a relationship of OS type of Linux. The lowest level of nodes in knowledge graph 300 represents browser type. As an example, edge 338 represents a browser type of Edge®, edge 340 represents a browser type of Firefox, edge 342 represents a browser type of Safari, and so on. Some nodes may contain similar information, but for different relationships. As an example, node 312 and node 318 both pertain to a browser type of Firefox, but for different operating systems. Thus, nuances pertaining to a particular operating system or other environmental condition can be stored in the corresponding node. For instance, any specific information for the combination of Windows and Firefox can be stored in node 312, while specific information for the combination of Linux and Firefox can be stored in node 318. Similarly, information for the combination of Linux and Chromium is stored in node 316. The knowledge graph depicted in FIG. 3 is used in following examples to further illustrate operation of embodiments of the present invention.

Figure 4A:
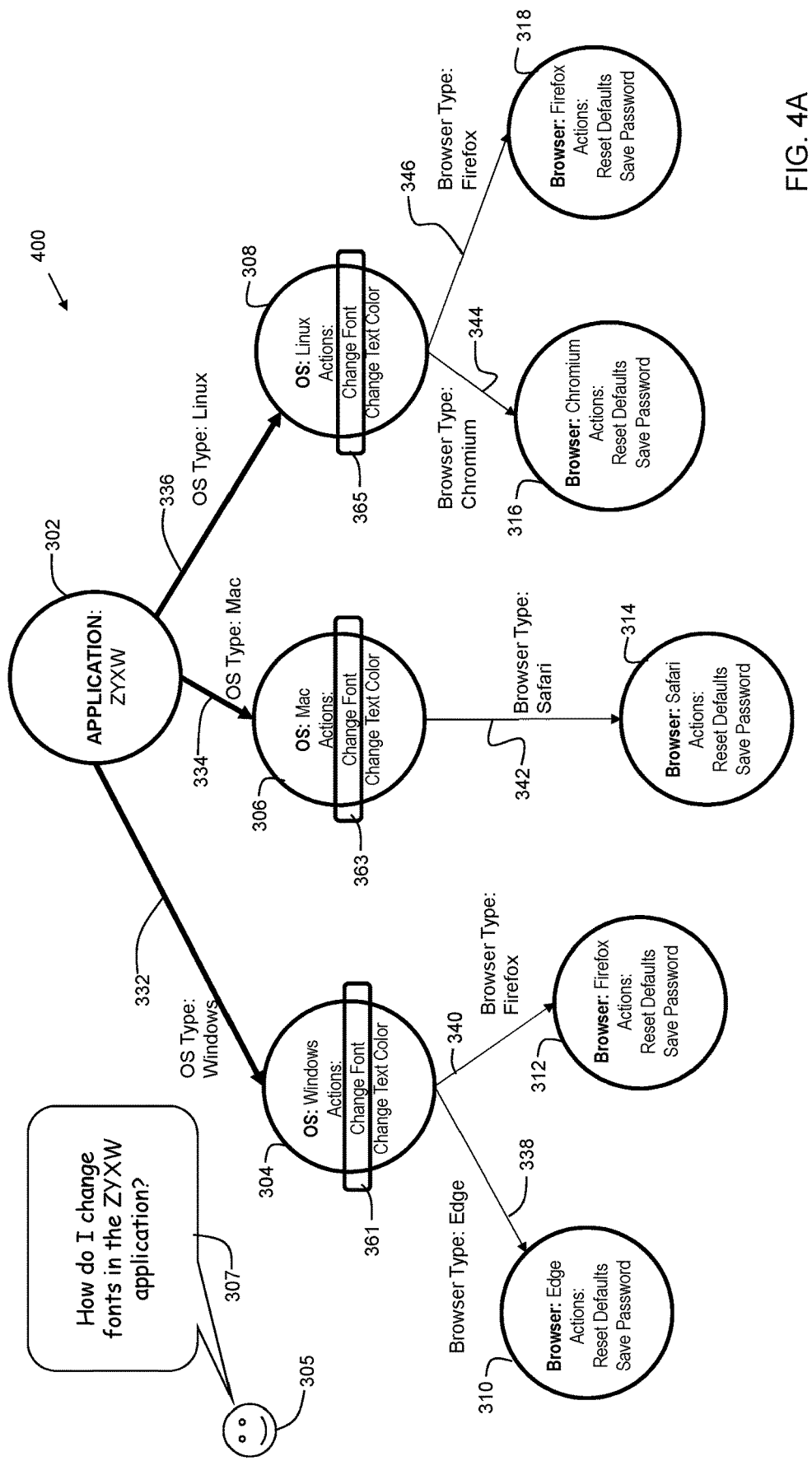
FIG. 4A is an exemplary knowledge graph indicating multiple potential edges.

FIG. 4A is an exemplary knowledge graph 400 indicating multiple potential edges. User 305 submits an input query 307 indicating "How do I change fonts in the ZYWX application?" The natural language processing system 122 extracts keywords such as "fonts" and "ZYWX" from the input query. The "ZYWX" keyword is used to identify a top-node 302 as relevant, since it contains the value "ZYWX" in the application field. The knowledge graph traversal system 102 traverses the knowledge graph 400, and identifies three nodes that have information pertaining to fonts. In embodiments, identifying one or more nodes comprises identifying one or more nodes that include the action identifier. Node 304 has action identifier 361 pertaining to fonts, node 306 has action identifier 363 pertaining to fonts, and node 308 has action identifier 365 pertaining to fonts. Since there are multiple possible nodes containing information, the knowledge graph traversal system 102 then evaluates each corresponding connected edge. Edge 332, 334, and 336 each have a relationship type of OS (operating system). In order to further narrow the relevant node of knowledge graph 400, the knowledge graph traversal system 102 creates a custom clarification statement in accordance with embodiments of the present invention. The custom clarification statement is based on the relationship type of the connected edges. The custom clarification statement is a statement to prompt a user for additional information, based on the knowledge graph nodes and/or edges.

Figure 4B:
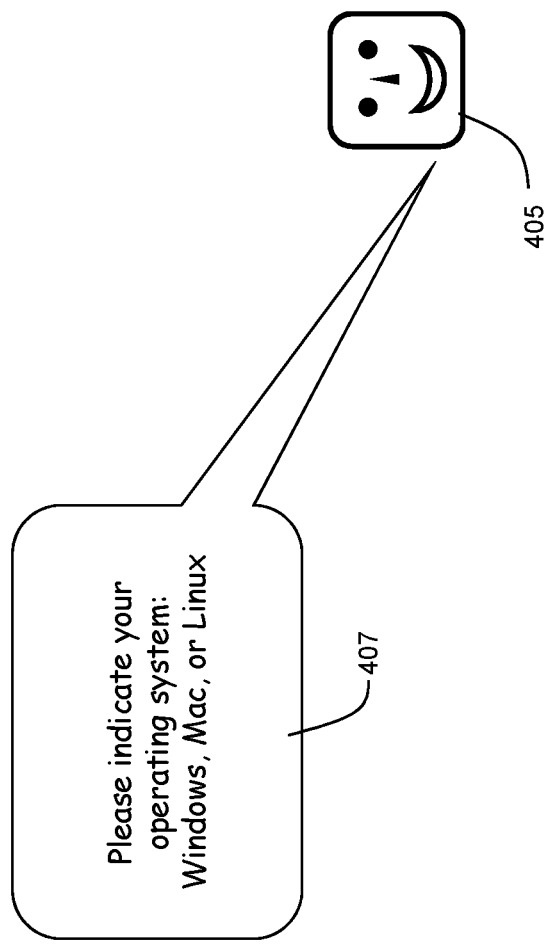
FIG. 4B indicates an exemplary custom clarification statement in accordance with embodiments of the present invention.
Figure 4B:
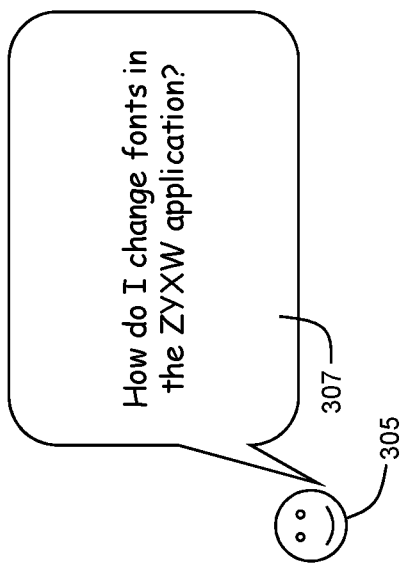

FIG. 4B indicates an exemplary custom clarification statement in accordance with embodiments of the present invention. In response to user 305 submitting an input query 307 indicating "How do I change fonts in the ZYWX application?" the chatbot (virtual assistant) 405 provides a custom clarification statement based on the relationship and relationship values of the identified nodes.

The knowledge graph traversal system 102 creates a custom clarification statement of the form:

Please indicate your [Relationship]: [Relationship value 1], [Relationship value 2], . . . [Relationship value N]

In the example, the relationship is OS (operating system), and the relationship values (from edges 332, 334, and 336 of FIG. 4A) indicate Windows, Mac, and Linux. Thus, the custom clarification statement, as shown at 407 is:

Please indicate your operating system: Windows, Mac, or Linux

Once the user provides the requested information via a following query (written or verbal), the proper node can be identified, and the relevant information provided to the user.

Figure 5A:
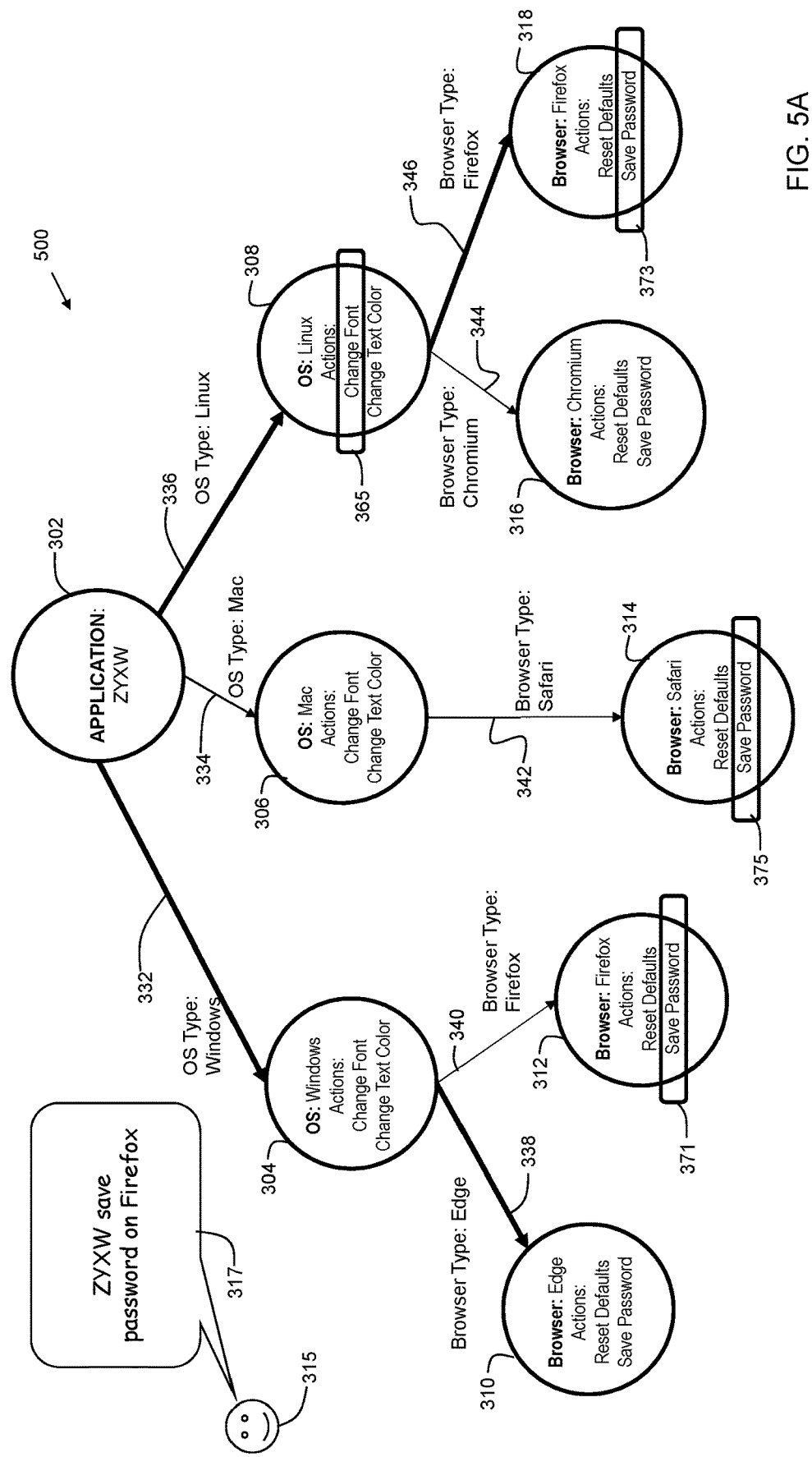
FIG. 5A is another exemplary knowledge graph indicating multiple potential edges.

FIG. 5A is another exemplary knowledge graph 500 indicating multiple potential edges. User 315 submits an input query 317 indicating "ZYWX save password on Firefox." The natural language processing system 122 extracts keywords such as "password," "Firefox," and "ZYWX" from the input query. The "ZYWX" keyword is used to identify a top-node 302 as relevant, since it contains the value "ZYWX" in the application field. The knowledge graph traversal system 102 traverses the knowledge graph 500, and identifies three nodes that have information pertaining to Firefox and passwords. Node 312 and node 318 each pertain to Firefox. Node 312 has action identifier 371 pertaining to passwords, and 318 also has an action identifier 373 pertaining to passwords. Node 314 has an action identifier 375 pertaining to passwords. However, node 314 pertains to an OS having a type "Safari" and not "Firefox." Thus, the edge 342 can be pruned from the traversal for this particular input query. Since there are multiple possible nodes containing information, the knowledge graph traversal system 102 then evaluates each corresponding connected edge. Edge 332 leads towards node 312, and edge 336 leads towards node 318. Edge 332 and edge 336 each have a relationship type of OS (operating system). In order to further narrow the relevant node of knowledge graph 500, the knowledge graph traversal system 102 creates a custom clarification statement in accordance with embodiments of the present invention. The custom clarification statement is based on the relationship type of the connected edges. In this case, as compared with the previous example, clarification is only required between two edges. Since edge 334 does not lead to a Firefox node, the knowledge graph traversal system 102 does not need to prompt the user regarding that specific relationship. The resulting custom clarification statement is shown in FIG. 5B.

Referring again to FIG. 5B, in response to user 315 submitting an input query 317 indicating "ZYWX save password on Firefox," the chatbot (virtual assistant) 415 provides a custom clarification statement based on the relationship and relationship values of the identified nodes. In the example, the relationship is OS (operating system), and the relationship values (from edges 332 and 336 of FIG. 5A) indicate Windows and Linux. Thus, the custom clarification statement, as shown at 417 is:

Please indicate your operating system: Windows, or Linux

The option of "Mac" is not provided since the knowledge graph traversal system 102 identified that edge 334 does not lead to a node pertaining to Firefox, which was a criterion provided in the user's input query. This technique serves to simplify the exchange between the human user and a computerized technical support system by not burdening the user with excess questions and options that do not lead to a solution.

Referring again to FIG. 5A, embodiments of the present invention may perform iterative processing, where multiple custom clarification statements are generated in order to narrow the eligible nodes to a single node. As an example, if the user 315 provides an input query of "Save password," then the first custom clarification statement may be generated based on the first level edges, which pertain to OS type. Thus, the first custom clarification statement may be "What OS type are you using?" If the user provides an answer of "Linux," then the next custom clarification statement, based on the subsequent edges (344 and 346) may be "What browser are you using?" If the user provides an answer of "Firefox," then the action description information associated with action identifier 373 from node 318 is provided to the remote computing device associated with the user. Thus, in embodiments, an iterative process of custom clarification statements based on knowledge graph traversal is performed.

Figure 6A:
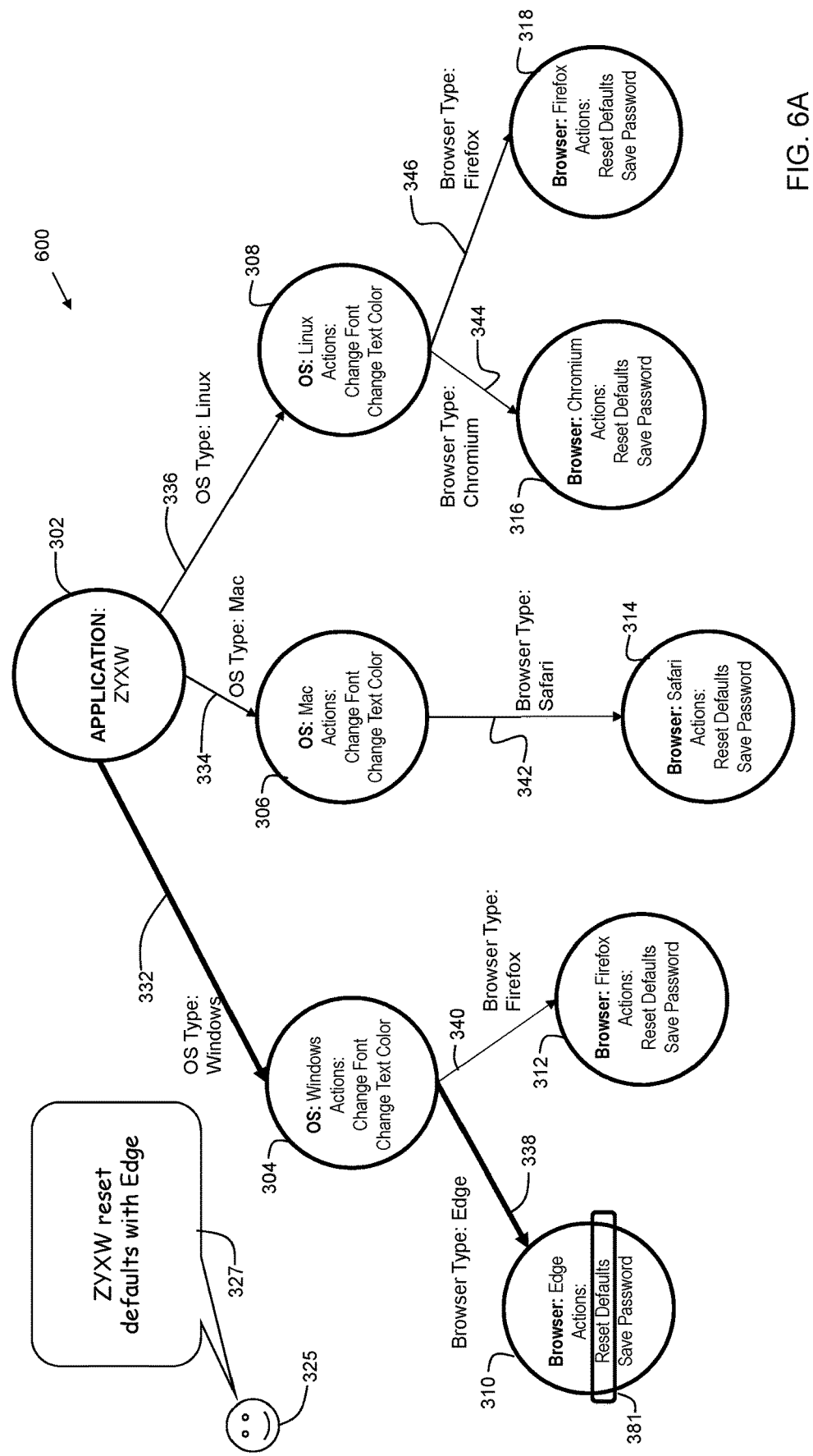
FIG. 6A is an exemplary knowledge graph indicating a single potential path.
Figure 6B:
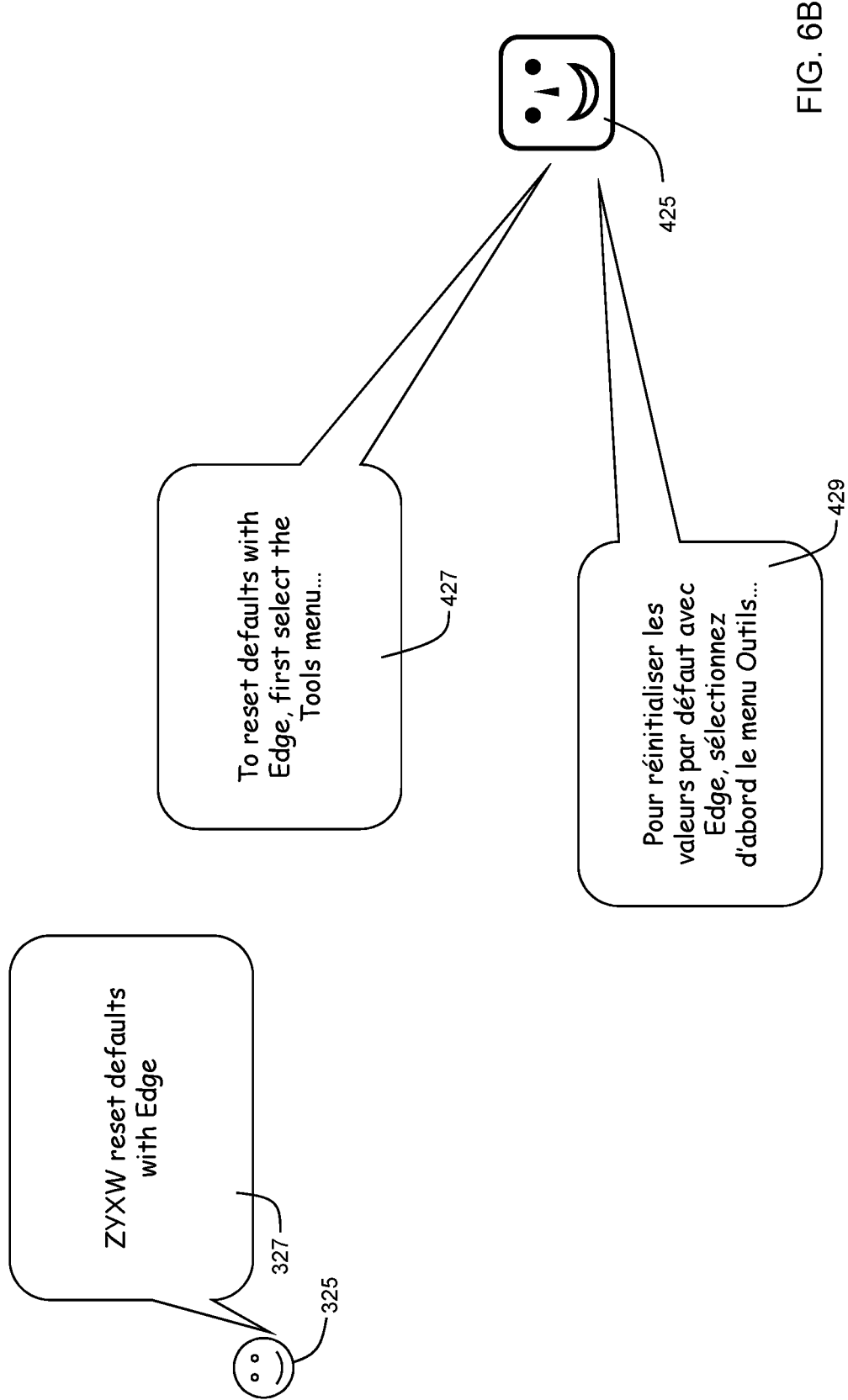
FIG. 6B shows an exemplary presentation of action description information.

FIG. 6A is an exemplary knowledge graph 600 indicating a single potential path. User 325 submits an input query 327 indicating "ZYWX reset defaults with Edge." The natural language processing system 122 extracts keywords such as "reset," "defaults," "Edge," and "ZYWX" from the input query. The "ZYWX" keyword is used to identify a top-node 302 as relevant, since it contains the value "ZYWX" in the application field. The knowledge graph traversal system 102 traverses the knowledge graph 600, and identifies a single node 310 that has information pertaining to Edge and defaults. Since there is only one possible node containing the requested information, the knowledge graph traversal system 102 then extracts action identifiers from node 310 to provide a presentation of action description information associated with action identifier 381 to the user. For this example, this is depicted in FIG. 6B.

Referring again to FIG. 6B, in response to user 325 submitting an input query 327 indicating "ZYWX reset defaults with Edge," the chatbot (virtual assistant) 425 provides a presentation of action description information 427 providing information such as "To reset defaults with Edge, first select the Tools menu . . . " (more steps and information may follow what is depicted in FIG. 6B). In this embodiment, the knowledge graph traversal system 102 provides a presentation of action description information to the user without needing to first generate a custom clarification statement since there is only one node identified that is relevant to the input query. The action description information may be conditioned via computer-implemented NLU (Natural Language Understanding) and/or Natural Language Processing (NLP) techniques prior to sending the information to a remote computing device of a user. In embodiments, conditioning the action description information includes machine-based language translation. An example of this is shown at 429, which includes a machine-translated French version of the English action description information 427. In some embodiments, a pre-established user profile containing preferences may be used to determine what types of conditioning are applied to the action description information. For example, if a user indicates a preference for French, then the conditioning may include machine-translation to French.

Figure 7:
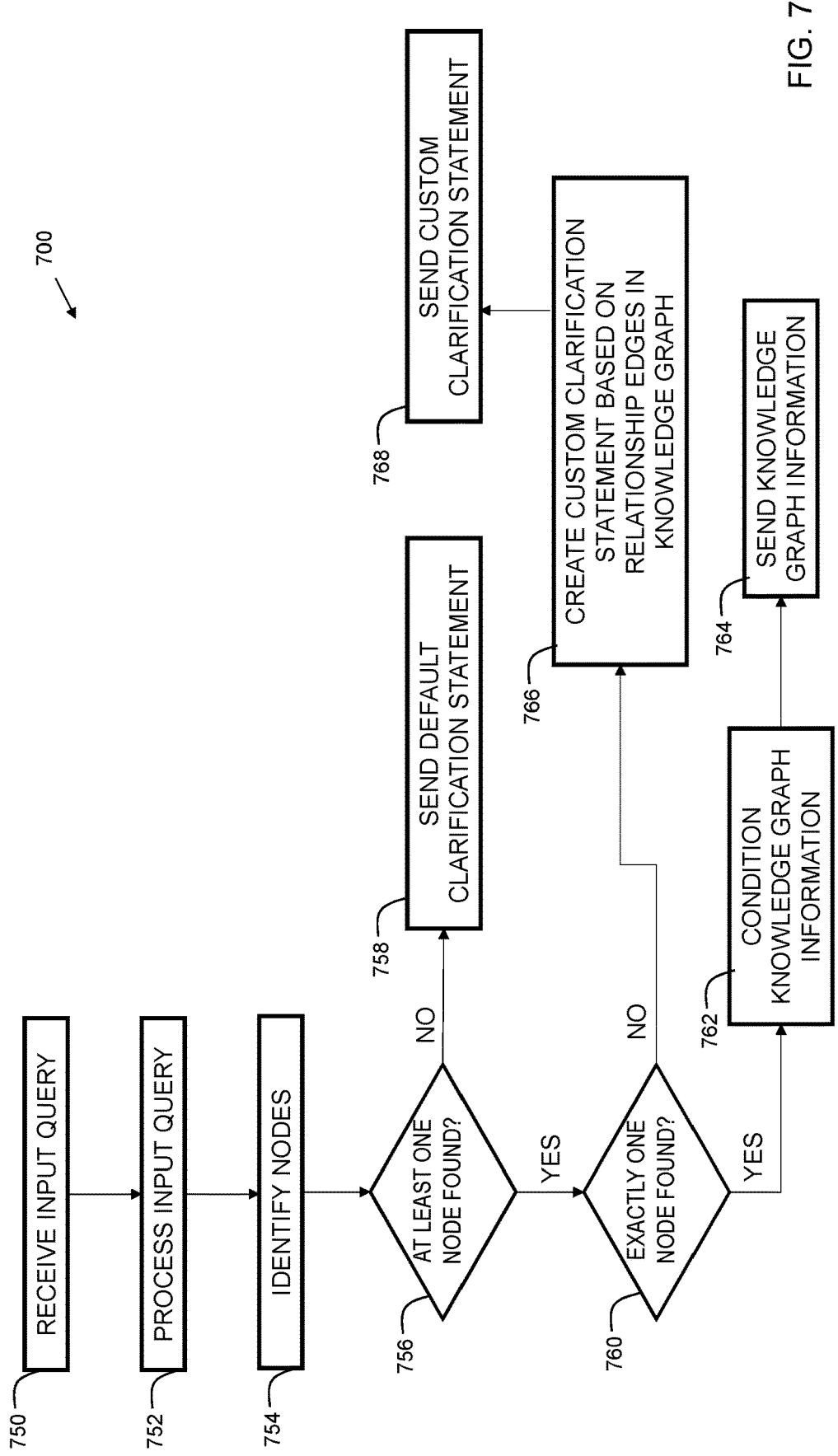
FIG. 7 is a flowchart indicating process steps for embodiments of the present invention.

FIG. 7 is a flowchart 700 indicating process steps for embodiments of the present invention. At 750, an input query is received. This can be provided by a user in natural language via written and/or verbal input. At 752, the input query is processed. The processing can be performed by a natural language processing system. In embodiments, the natural language processing system is cloud-based. In embodiments, a client device operated by the user acquires raw text and/or raw audio waveforms and provides the text/audio waveforms to the natural language processing system. The natural language processing system performs various functions such as entity detection, disambiguation, and keyword generation, and provides information, including keywords, to the knowledge graph traversal system 102. At 754, nodes are identified. In embodiments, the knowledge graph traversal system 102 searches nodes within the knowledge graphs stored in knowledge database 114. At 756, a check is made to see if at least one node is found, where a keyword matches action description information of the node. If no, then at 758, a default clarification statement is sent. The default clarification statement is issued when the input query information is not able to identify any candidate nodes. An example default clarification statement may be "Your input is not understood. Please rephrase the question and try again." If, at 756, at least one node is found, then the process continues to 760. If, at 760, exactly one node is found, then the process continues to 762, where the knowledge graph information, including action description information, is conditioned for presentation to a user. The conditioning can include, but is not limited to, formatting, foreign language translation, dialect conversion (e.g., converting from US English to Australian English), and/or other changes to the appearance and/or sound of a response. At 764, the conditioned knowledge graph information is sent to a client device (e.g., 116) associated with a user. Thus, embodiments can include receiving action description information from the knowledge graph, conditioning the action description information, and sending the action description information to a remote computing device.

If, at 760, there is more than one node found, then the process continues to 766, where a custom clarification statement is created based on relationship edges in the knowledge graph. Examples of such clarification statements are shown in FIG. 4B and FIG. 5B. The custom clarification statements serve to elicit additional information from the human user to further narrow down the number of potentially relevant nodes in the knowledge graph. At 768, the custom clarification statement is sent to a client device (e.g. 116) associated with a user. Upon receiving the custom clarification statement, the user can provide a response via his/her client device to further narrow the number of potentially relevant nodes. This process may iterate until a single node is identified, or the number of nodes is not being reduced any further with subsequent user input. Once the process converges to this point, action description information from the relevant node or nodes is sent to a remote computing device (e.g., client device) associated with the user.

Figure 8A:
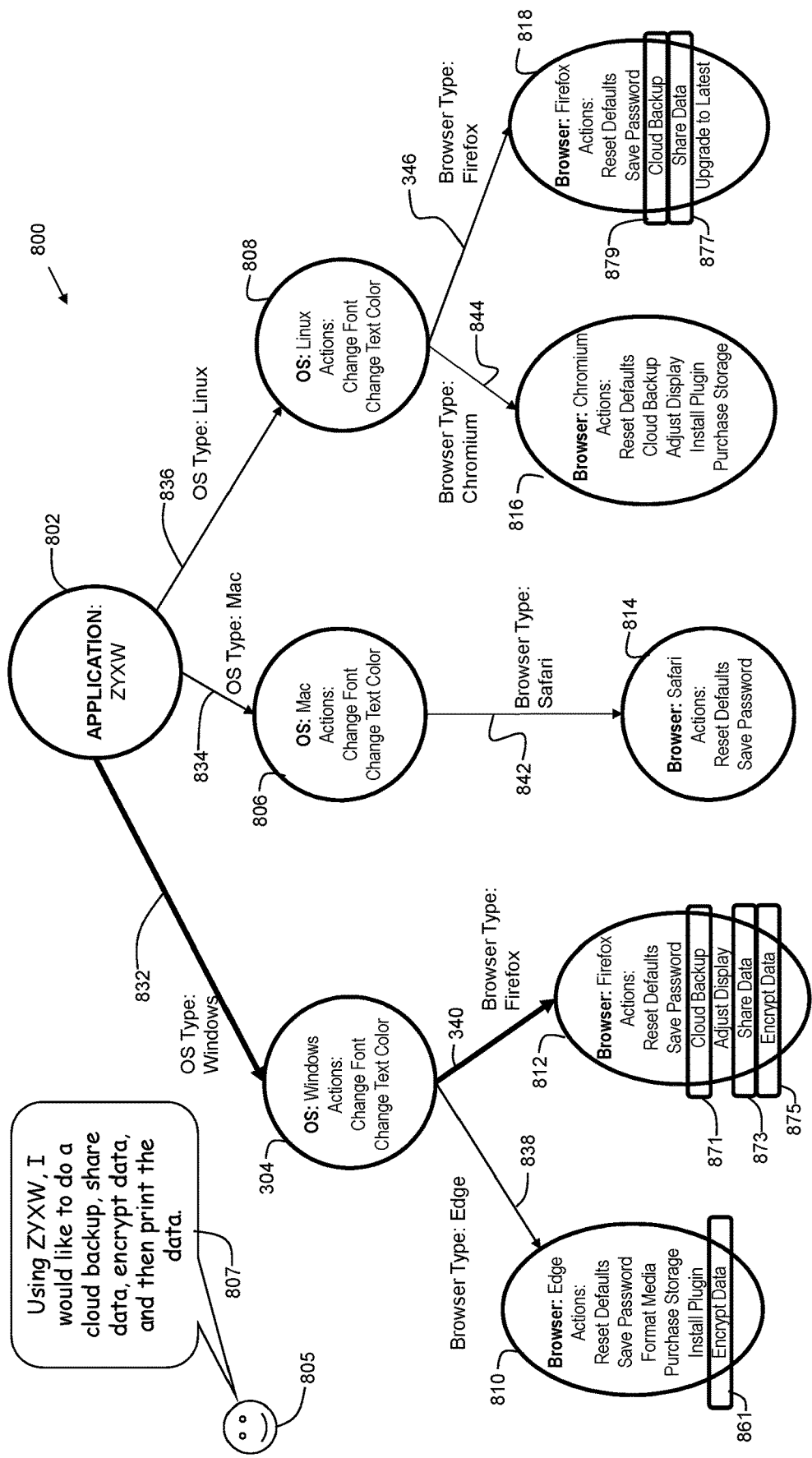
FIG. 8A is an exemplary knowledge graph illustrating node ranking.

FIG. 8A is an exemplary knowledge graph 800 illustrating node ranking. User 805 submits an input query 807 indicating "Using ZYWX, I would like to do a cloud backup, share data, encrypt data, and then print the data." The natural language processing system 122 extracts keywords such as "encrypt," "print," "backup," "share," and "ZYWX" from the input query. The "ZYWX" keyword is used to identify a top-node 802 as relevant, since it contains the value "ZYWX" in the application field. The knowledge graph traversal system 102 traverses the knowledge graph 800, and identifies multiple nodes that have information pertaining to the input query. However, in this scenario, no one node includes all the relevant keywords/topics of the input query. In embodiments, the nodes are ranked based on a score and/or statistical confidence level. In some embodiments, the node that ranks the highest (e.g., most closely corresponds to the input query) is presented to the user's computing device. Thus, embodiments can include computing a score for each of the one or more identified nodes and ranking the one or more identified nodes based on the computed score.

Relevant action identifiers are action identifiers that include and/or match one or more keywords from the input query. Referring again to FIG. 8A, node 810 contains one relevant action identifier 861 of "Encrypt Data." Node 818 contains two relevant action identifiers, 877 "Cloud Backup" and 879 "Share Data." Node 812 contains three relevant action identifiers, 871 "Cloud Backup," 873 "Share Data," and 875 "Encrypt Data." In embodiments, each relevant action identifier results in adding a point to a total score. In this example, node 810 has a total score of one point, node 818 has a total score of two points, and node 812 has a total score of three points. Thus, in this example, node 812 is ranked the highest. In embodiments, the highest ranked node may be used as a criterion in forming a custom clarification statement. For example, the relationship type for the highest ranked node may be included first within the statement. Since the path of the knowledge graph 800 includes edge 832 and edge 840, the custom clarification statement may include relationships defined in those edges. As an example, based on input query 807, and the knowledge graph 800, the custom clarification statement may be of the general form:

Please confirm you are using: [Relationship 1 edge] [Relationship 2 edge] [Relationship N edge]

In the example of FIG. 8A, there are two levels of relationships shown, so N=2, and relationship 1 edge is 832 and relationship 2 edge is 840. Thus, a custom clarification statement created by disclosed embodiments may state:

Please confirm you are using OS Type: Windows, Browser Type: Firefox

In other embodiments, multiple custom clarification statements may be presented on the user's remote computing device in a ranked order, based on scoring of the nodes as previously stated. Referring again to FIG. 8A, based on input query 807, the highest ranked node 812 is reached from the top-level node 802 via edge 832 and 840. The second highest ranked node is reached from the top-level node 802 via edge 836 and 846. The third highest ranked node is reached from the top-level node 802 via edge 832 and 810. Continuing with the example, the multiple custom clarification statements may be presented to the user's remote computing device in a ranked listing as shown below:

Please confirm you are using:
A) OS Type: Windows, Browser Type: Firefox
B) OS Type: Linux, Browser Type: Firefox
C) OS Type: Windows, Browser Type: Edge FIG. 8B indicates an exemplary conditioning of the action description information. User 805 submits an input query 807 indicating "Using ZYWX, I would like to do a cloud backup, share data, encrypt data, and then print the data." As described previously, the path from the top-level node to the highest ranked node utilizes edges that generate the custom clarification statement 827 of "Please confirm you are using OS Type: Windows, Browser Type: Firefox." Thus, embodiments can include presenting the highest ranked node path as a custom clarification statement. In embodiments, the custom clarification statement may be conditioned prior to sending to a remote computing device associated with a user. In embodiments, conditioning the custom clarification statement includes machine-based language translation. Referring again to FIG. 8B, conditioned custom clarification statement 829 provided by chatbot 825 is a machine-translated French version of the English custom clarification statement 827. In some embodiments, a pre-established user profile containing preferences may be used to determine what types of conditioning are applied to the custom clarification statement. For example, if a user indicates a preference for French, then the conditioning may include machine-translation to French. Thus, embodiments can include creating the custom clarification statement based on the highest ranked node path and presenting the custom clarification statement.

Figure 9:
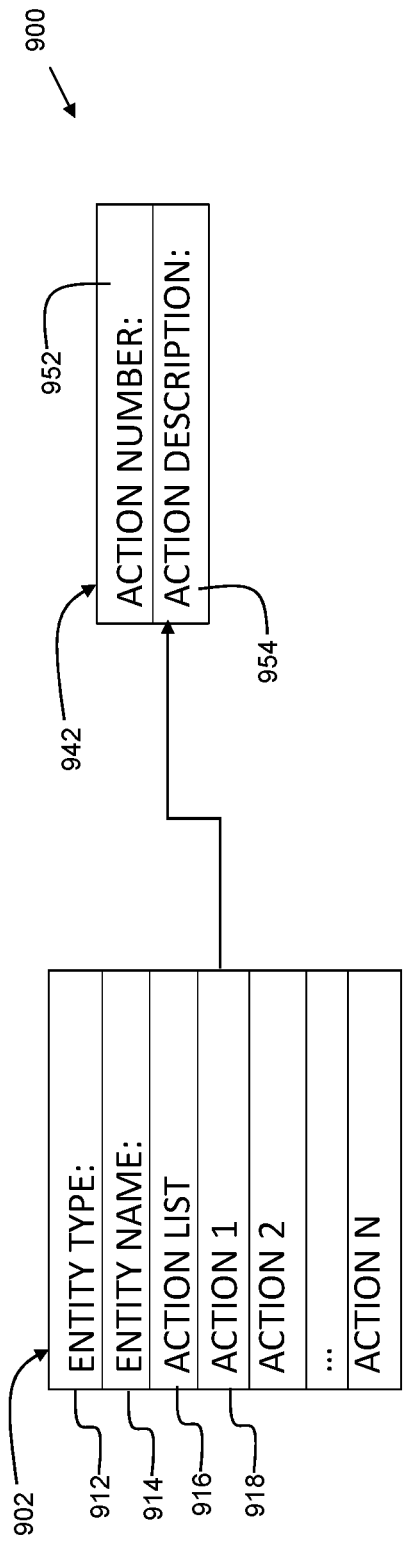
FIG. 9 shows data included within a node in accordance with embodiments of the present invention.

FIG. 9 shows a diagram 900 of data included within a node in accordance with embodiments of the present invention. The data can include an action list table 902. The action list table 902 includes an entity type field 912, an entity name field 914, and an action list 916. The action list 916 includes one or more actions such as action field 918.

Each action refers to an action description entry 942. Field 918 refers to action 1. The corresponding action description entry table is 942. The action description entry table 942 includes an action number field 952 and an action description field 954. In embodiments, the action description field 954 includes information pertaining to an operation, task, and/or troubleshooting procedure for a computer application. Nodes of the knowledge graphs stored in knowledge database 114 may include the tables shown in FIG. 9, as well as additional tables. In embodiments, the tables may be stored in a relational database such as an SQL database.

Figure 10:
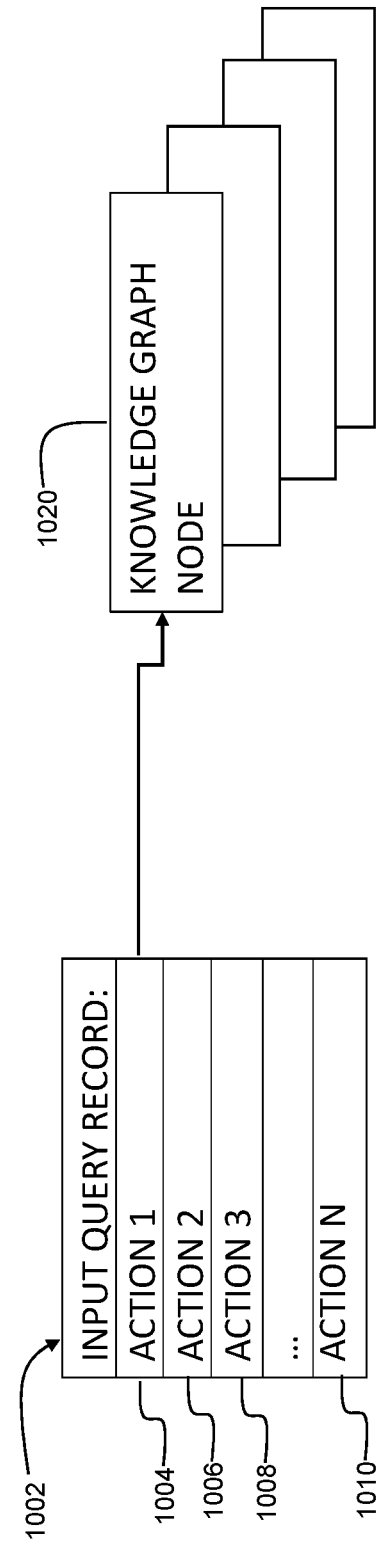
FIG. 10 shows a data structure for an input query record in accordance with embodiments of the present invention.

FIG. 10 shows a diagram 1000 data structures for an input query record 1002 in accordance with embodiments of the present invention. In embodiments, input query records are stored in query database 128 to improve performance when multiple similar input queries are received. One scenario where this can occur is when multiple users ask a similar question (e.g., "how do I change font size in the ZYWX app?") to a virtual assistant (chatbot). The first received input query causes the knowledge graph traversal system 102 to traverse the knowledge graph to identify relevant edges and nodes. When a second input query is received that has similar keywords/context, the query database 128 is searched and a matching input query record is found. The relevant nodes are then identified from the query database, rather than having to traverse the knowledge graph. While the knowledge graph shown in FIG. 2 is relatively simple, in practice, knowledge graphs can have hundreds, or even thousands, of nodes, with many levels and relationships, resulting in millions of possible paths. Thus, with large knowledge graphs, considerable processing resources may be conserved by utilizing the query database 128 in accordance with embodiments of the present invention. Embodiments can include storing the input query in a query database, wherein the input query is associated with the one or more identified nodes. In embodiments, identifying one or more nodes comprises identifying an input query record that includes the action identifier. In embodiments, each action field (1004-1010) can be linked to one or more knowledge graph nodes 1020.

Figure 11:
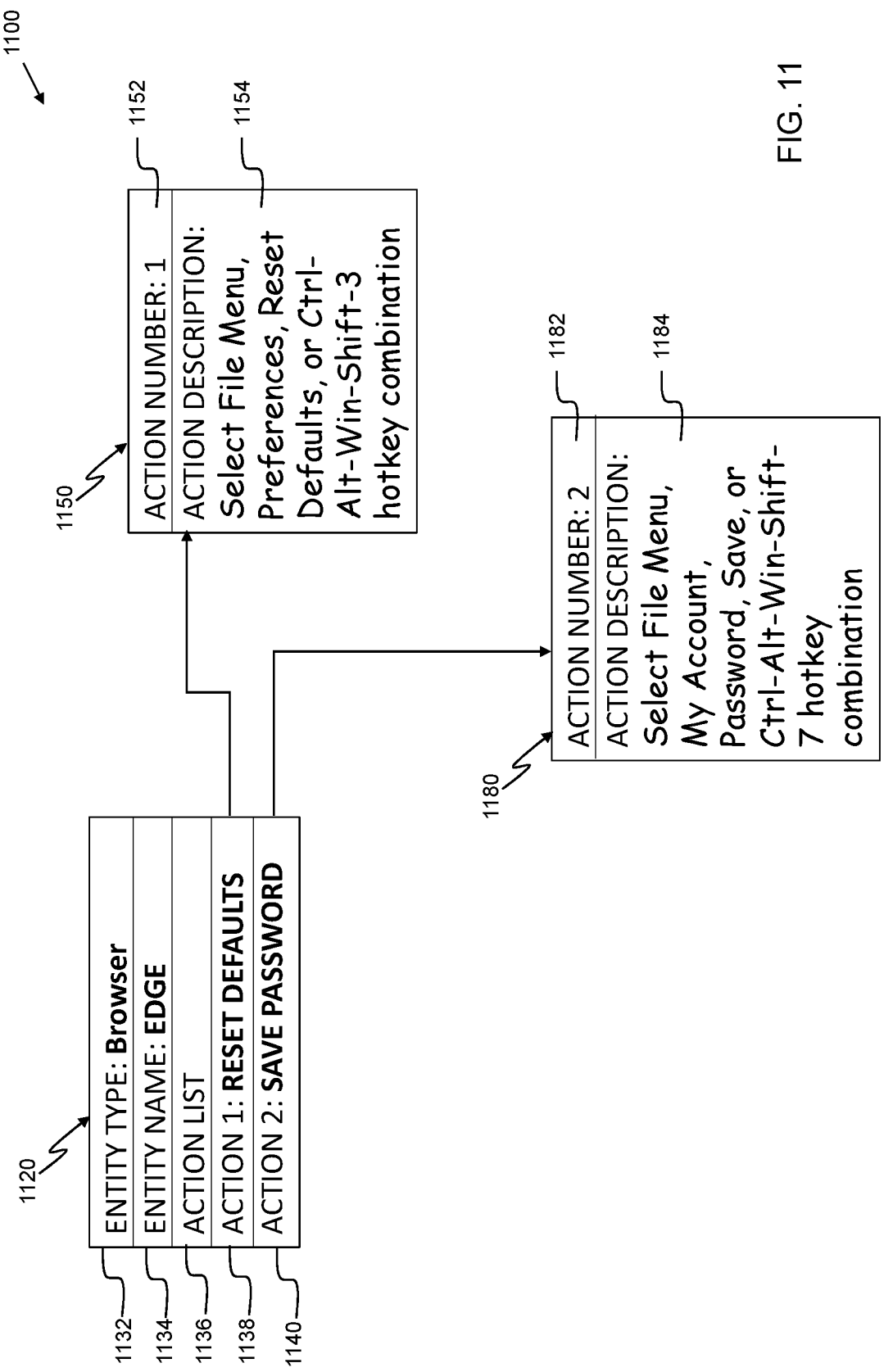
FIG. 11 shows exemplary node and action data.

FIG. 11 shows a diagram 1100 of exemplary node and action data. Knowledge base node 1120 includes an entity type field 1132 that has the value "Browser." Knowledge base node 1120 includes an entity name field 1134 that has the value "EDGE." Knowledge base node 1120 includes an action list 1136 that contains two action entry field. Action entry field 1138 has the value "RESET DEFAULTS." Action entry field 1140 has the value "SAVE PASSWORD." Action entry field 1138 is associated with action description entry table 1150. Action entry field 1140 is associated with action description entry table 1180. Action description entry table 1150 includes an action number field 1152 which indicates a value of "1." Action description entry table 1150 includes an action description field 1154 which includes text instructions for performing a particular action (in this example, resetting defaults). Action description entry table 1180 includes an action number field 1182 which indicates a value of "2." Action description entry table 1180 includes an action description field 1184 which includes text instructions for performing a particular action (in this example, saving a password).

Figure 12:
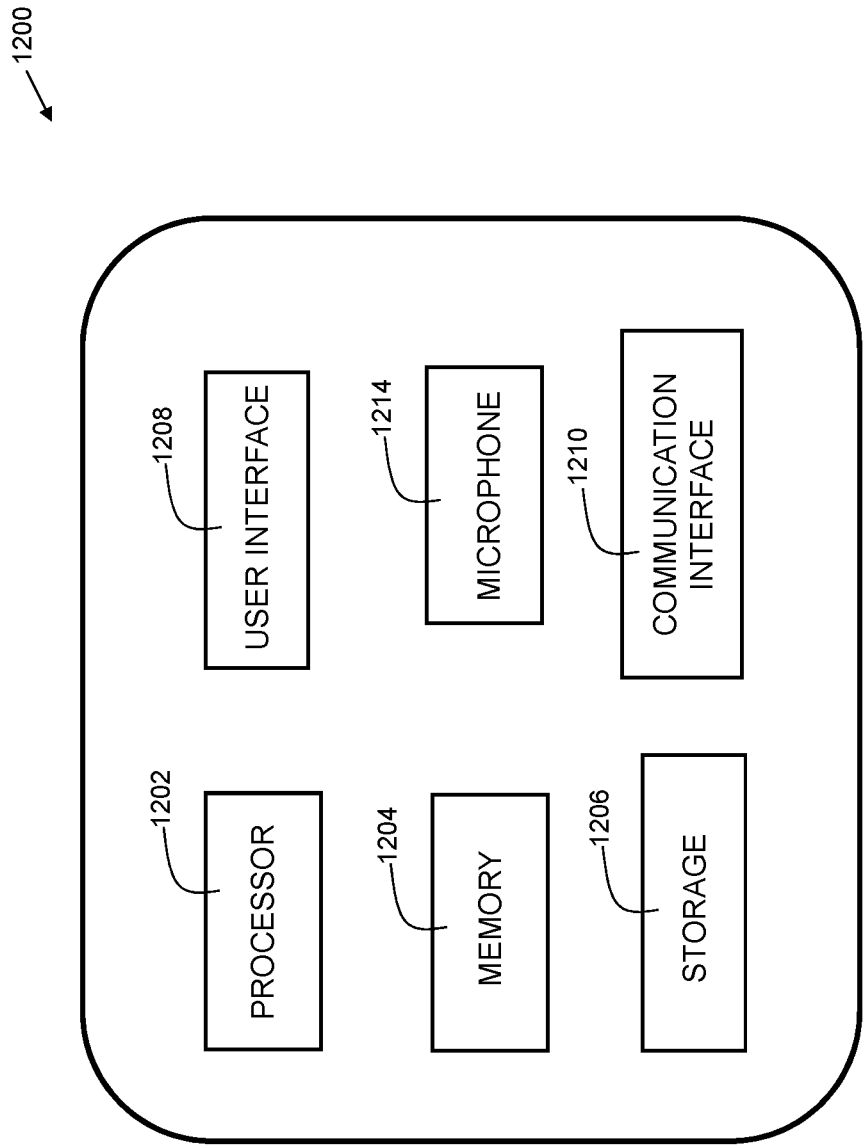
FIG. 12 is a block diagram of a client device used in embodiments of the present invention.

FIG. 12 shows a block diagram of an electronic device used with embodiments of the present invention that may act as a client device such as 116 or 118 of FIG. 1. Device 1200 can be a smartphone, tablet computer, or other computing device. Device 1200 includes a processor 1202, which is coupled to a memory 1204. Memory 1204 may include dynamic random-access memory (DRAM), static random-access memory (SRAM), magnetic storage, and/or a read only memory such as flash, EEPROM, optical storage, or other suitable memory. In some embodiments, the memory 1204 may not be a transitory signal per se.

Device 1200 may further include storage 1206. In embodiments, storage 1206 may include one or more magnetic storage devices such as hard disk drives (HDDs). Storage 1206 may additionally include one or more solid state drives (SSDs).

Device 1200 further includes user interface 1208. This may be a display, such as an LED display, a touch-sensitive screen, a keyboard, a mouse, or any other suitable interface for a user to interact with device 1200.

The device 1200 further includes a communication interface 1210. The communication interface 1210 may be a wired communication interface that includes Ethernet, Gigabit Ethernet, or the like. In embodiments, the communication interface 1210 may include a wireless communication interface that includes modulators, demodulators, and antennas for a variety of wireless protocols including, but not limited to, Bluetooth™, Wi-Fi, and/or cellular communication protocols for communication over a computer network.

Device 1200 may further include a microphone 1214 for capturing user utterances and speech. The microphone may be integral with the device 1200 as shown, or connected thereto via a wired or wireless connection.

Figure 13:
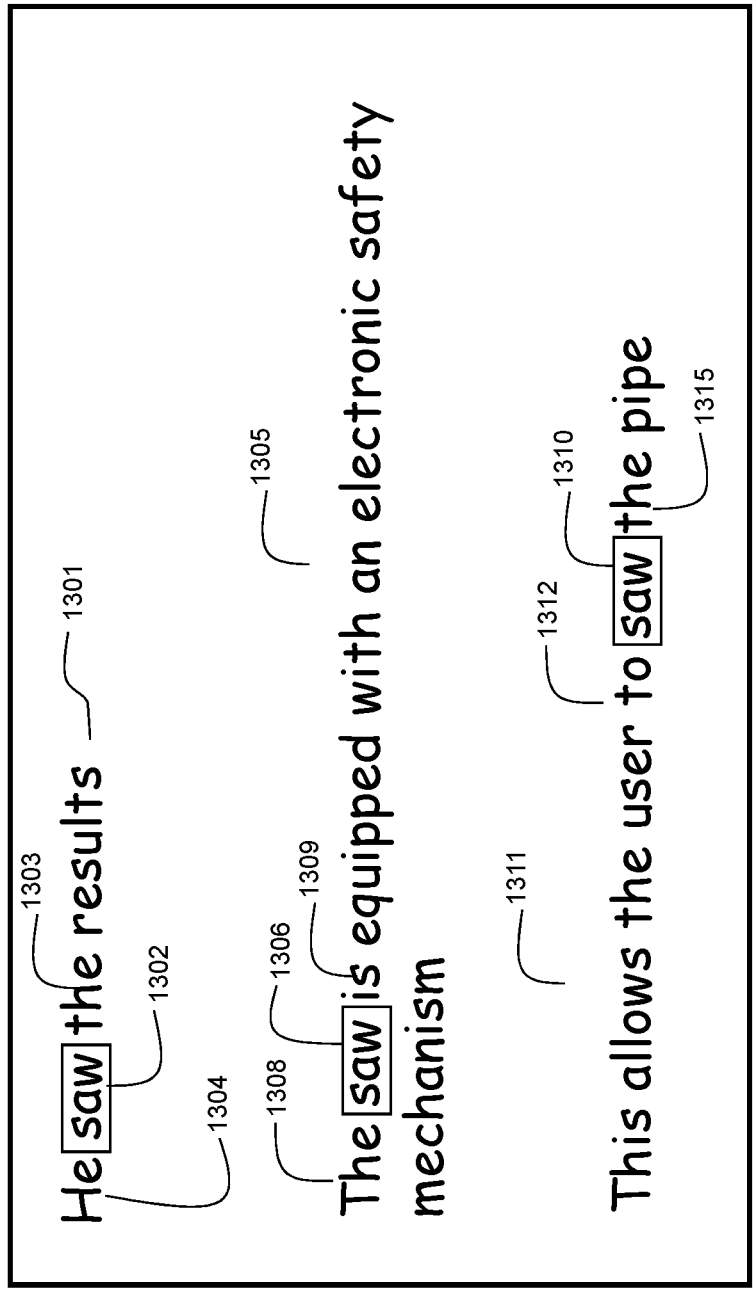
FIG. 13 shows examples of natural language processing that may be utilized in embodiments of the present invention.

FIG. 13 shows examples of natural language processing that may be utilized in embodiments of the present invention. Disambiguation is one of the processes that may be utilized in embodiments of the present invention. As part of performing natural language understanding (NLU) and/or natural language processing (NLP), text may be tokenized into words and tagged with parts of speech. For some words, there can be more than one meaning and/or part of speech. FIG. 13 shows a disambiguation example with the word "saw." In phrase 1301, the word "saw" 1302 is a past tense verb. In embodiments, the natural language processing system 122 may identify the prior token 1304 to the word "saw" 1302 as a pronoun, and the following token 1303 as an article. In training a classifier, the pattern of pronoun-token-article may be associated with a verb, and thus the token is interpreted as a verb.

In phrase 1305, the word "saw" 1306 is a noun for a cutting tool. In embodiments, the natural language processing system 122 may identify the prior token 1308 to the word saw as an article, and the following token 1309 as a verb. In training a classifier, the pattern article-token-verb may be associated with a noun, and thus the token is interpreted as a noun.

In phrase 1311, the word "saw" 1310 is a present tense verb. In embodiments, the natural language processing system 122 may identify the prior token 1312 to the word "saw" as part of an infinitive form, and the following token 1315 as an article. In training a classifier, the pattern "to"-token-article may be associated with a verb, and thus the token is interpreted as a verb in its infinitive form. These classifiers and techniques for disambiguation are merely examples, and other classifiers and techniques are possible. Thus, embodiments include performing a computerized natural language analysis process to analyze user-supplied input queries, and performing conditioning on response returned to the remote computing device associated with the user.

As can now be appreciated, disclosed embodiments provide techniques for computerized technical support. By using a knowledge graph as the underlying structure for workflow, the complexities of computerized technical support are greatly reduced. Disclosed embodiments replace manually predefined workflows with a knowledge graph used to control workflow of conversations and/or interactions between a human and a computerized technical support system. While the examples described herein show use cases for technical support, disclosed embodiments of the present invention can be utilized in other applications where a user is seeking assistance or support. Other applications can include medical diagnostics, academic applications, and/or virtual assistants (wizards) to assist users in selecting an appropriate product. Thus, disclosed embodiments use a knowledge graph to allow computerized systems dynamically interact with human users.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for generating an automated technical support workflow, comprising:

receiving an input query;

processing the input query to extract an action identifier;

identifying one or more nodes within a knowledge graph that include the action identifier;

identifying one or more relationship edges for the one or more identified nodes;

in response to more than one identified node being found, creating a custom clarification statement that incorporates information from the one or more identified relationship edges and the one or more identified nodes; and in response to the more than one identified node corresponding to the input query having been found, storing the input query together with a set of relevant nodes based on the more than one identified node at in a query database such that a subsequent query can access the more than one identified node without a need for performing a full traversal of the set of identified nodes.

2. The method of claim 1, further comprising storing the input query in a query database, wherein the input query is associated with the one or more identified nodes.

3. The method of claim 2, wherein identifying one or more nodes comprises identifying one or more nodes that include the action identifier.

4. The method of claim 1, further comprising:
computing a score for each of the one or more identified nodes; and
ranking the one or more identified nodes based on the computed score.

5. The method of claim 4, further comprising:
creating the custom clarification statement based on a highest ranked node path; and
presenting the custom clarification statement.

6. The method of claim 1, wherein identifying one or more nodes comprises identifying an input query record that includes the action identifier.

7. The method of claim 1, further comprising:
receiving action description information from the knowledge graph;
conditioning the action description information; and
sending the action description information to a remote computing device.

8. The method of claim 7, wherein conditioning the action description information includes machine-based language translation.

9. An electronic computation device comprising:
a processor;
a memory coupled to the processor, the memory containing instructions, that when executed by the processor, cause the electronic computation device to:
receive an input query;
process the input query to extract an action identifier;
identify one or more nodes within a knowledge graph that include the action identifier;
identify one or more relationship edges for the one or more identified nodes; and
in response to more than one identified node being found, create a custom clarification statement that incorporates information from the one or more identified relationship edges and the one or more identified nodes; and
in response to the more than one identified node corresponding to the input query having been found, storing the input query together with a set of relevant nodes based on the more than one identified node at in a query database such that a subsequent query can access the more than one identified node without a need for performing a full traversal of the set of identified nodes.

10. The electronic computation device of claim 9, wherein the memory further comprises instructions, that when executed by the processor, cause the electronic computation device to store the input query in a query database, wherein the input query is associated with the one or more identified nodes.

11. The electronic computation device of claim 10, wherein the memory further comprises instructions, that when executed by the processor, cause the electronic computation device to identify an input query record that includes the action identifier.

12. The electronic computation device of claim 9, wherein the memory further comprises instructions, that when executed by the processor, cause the electronic computation device to:
compute a score for each of the one or more identified nodes; and
rank the one or more identified nodes based on the computed score.

13. The electronic computation device of claim 12, wherein the memory further comprises instructions, that when executed by the processor, cause the electronic computation device to:
create the custom clarification statement based on a highest ranked node path; and
present the custom clarification statement.

14. The electronic computation device of claim 9, wherein the memory further comprises instructions, that when executed by the processor, cause the electronic computation device to identify one or more nodes by identifying one or more nodes that include the action identifier.

15. The electronic computation device of claim 9, wherein the memory further comprises instructions, that when executed by the processor, cause the electronic computation device to:
retrieve action description information from the knowledge graph;
condition the action description information, and send the action description information to a remote computing device.

16. A computer program product for an electronic computation device comprising a computer readable storage medium having program instructions embodied therewith, the program instructions executable by a processor to cause the electronic computation device to:
receive an input query;
process the input query to extract an action identifier;
identify one or more nodes within a knowledge graph that include the action identifier;
identify one or more relationship edges for the one or more identified nodes; and
in response to more than one identified node being found, create a custom clarification statement that incorporates information from the one or more identified relationship edges and the one or more identified nodes; and
in response to the more than one identified node corresponding to the input query having been found, storing the input query together with a set of relevant nodes based on the more than one identified node at in a query database such that a subsequent query can access the more than one identified node without a need for performing a full traversal of the set of identified nodes.

17. The computer program product of claim 16, wherein the computer readable storage medium includes program instructions executable by the processor to cause the electronic computation device to store the input query in a query database, wherein the input query is associated with the one or more identified nodes.

18. The computer program product of claim 16, wherein the computer readable storage medium includes program instructions executable by the processor to cause the electronic computation device to:
   compute a score for each of the one or more identified nodes; and
   rank the one or more identified nodes based on the computed score.

19. The computer program product of claim 18, wherein the computer readable storage medium includes program instructions executable by the processor to cause the electronic computation device to:
   create the custom clarification statement based on a highest ranked node path; and
   present the custom clarification statement.

20. The computer program product of claim 19, wherein the computer readable storage medium includes program instructions executable by the processor to cause the electronic computation device to:
   retrieve action description information from the knowledge graph;
   condition the action description information; and
   send the action description information to a remote computing device.

* * * * *